July 9, 1946.  C. B. MADDOCK  2,403,668
APPARATUS FOR FORMING SURFACES OF REVOLUTION
Filed July 20, 1939  5 Sheets-Sheet 1
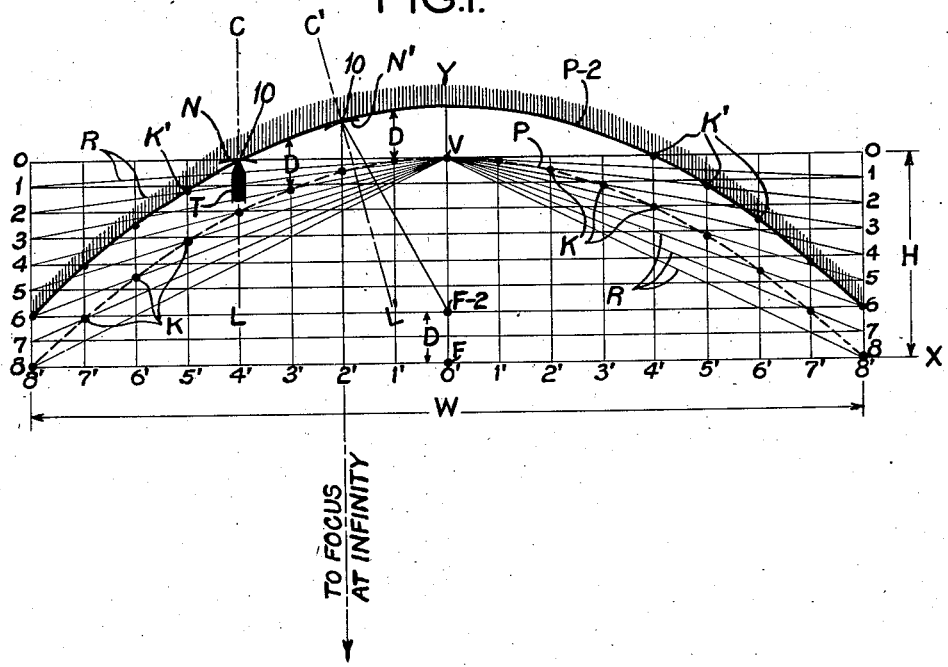
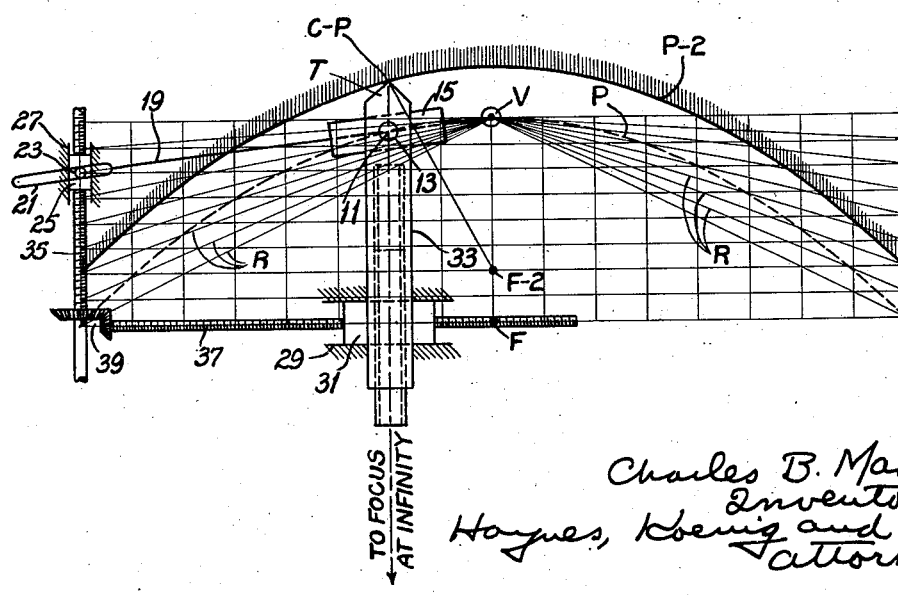
Charles B. Maddock,
Inventor
Haynes, Koenig and Wolf,
Attorneys July 9, 1946.  C. B. MADDOCK  2,403,668
APPARATUS FOR FORMING SURFACES OF REVOLUTION
Filed July 20, 1939  5 Sheets-Sheet 2
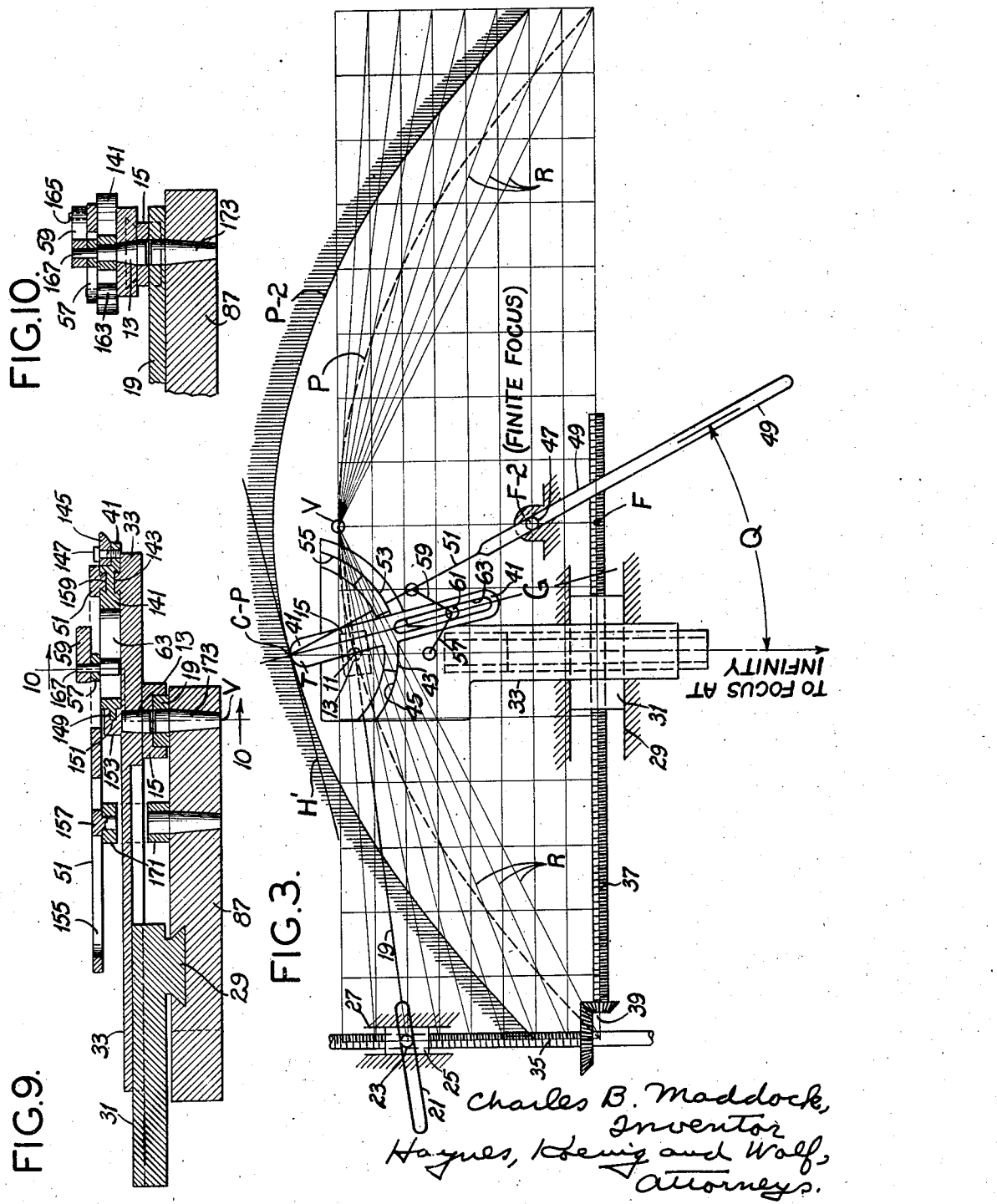

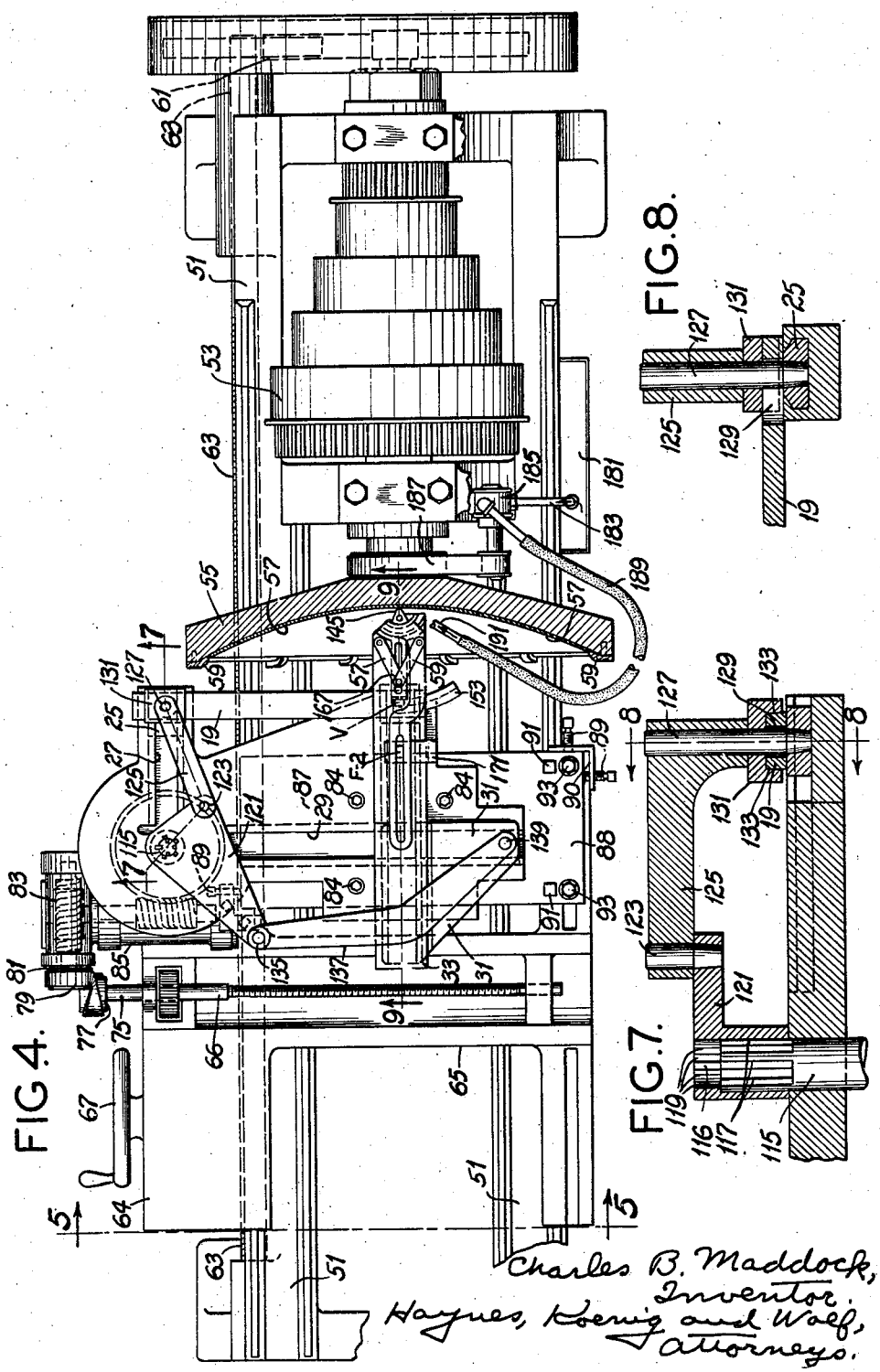

Charles B. Maddock, Inventor
Haynes, Koenig and Wolf, Attorneys

July 9, 1946.　　　　C. B. MADDOCK　　　　2,403,668
APPARATUS FOR FORMING SURFACES OF REVOLUTION
Filed July 20, 1939　　　5 Sheets-Sheet 5

Charles B. Maddock,
Inventor.
Haynes, Koenig and Wolf,
Attorneys.

Patented July 9, 1946

2,403,668

UNITED STATES PATENT OFFICE 2,403,668

APPARATUS FOR FORMING SURFACES OF REVOLUTION

Charles B. Maddock, St. Louis, Mo., assignor to Baker & Company, Inc., Newark, N. J., a corporation of New Jersey Application July 20, 1939, Serial No. 285,482

22 Claims. (Cl. 82—11)

This invention relates to apparatus for forming surfaces of revolution having conic, longitudinal sections, and with regard to certain more specific features, to apparatus of the class described which will form paraboloids.

Among the several objects of the invention may be noted the provision of apparatus for forming paraboloids and the like which accomplishes the desired result with a high degree of overall accuracy, but particularly in a region where prior apparatus failed, namely, near the vertex; and the provision of apparatus of the class described which will reduce the cost of high-accuracy products such as searchlight, telescopic and other reflectors and permit them to be turned out satisfactorily in quantity. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several various possible embodiments of the invention, Fig. 1 is a diagram illustrating certain basic geometric concepts;

Fig. 2 is a geometric diagram similar to Fig. 1 but showing superimposed a kinematic diagram;

Fig. 3 is a view similar to Fig. 2, but shown on an enlarged scale and illustrating additional kinematic features of a bisecting mechanism;

Fig. 4 is a plan view of the mechanism applied to a lathe embodying the principles of the invention, the view being taken on line 4—4 of Fig. 5 so as to maintain all projections orthographic;

Fig. 7 is a vertical detail section taken on line 7—7 of Fig. 4;

Fig. 8 is a vertical detail section taken on line 8—8 of Fig. 7;

Fig. 9 is a vertical detail section taken on line 9—9 of Fig. 4;

Fig. 10 is a vertical section taken on line 10—10 of Fig. 9;

Similar reference characters indicate corresponding parts throughout the several views of the drawings.

Figure 5:
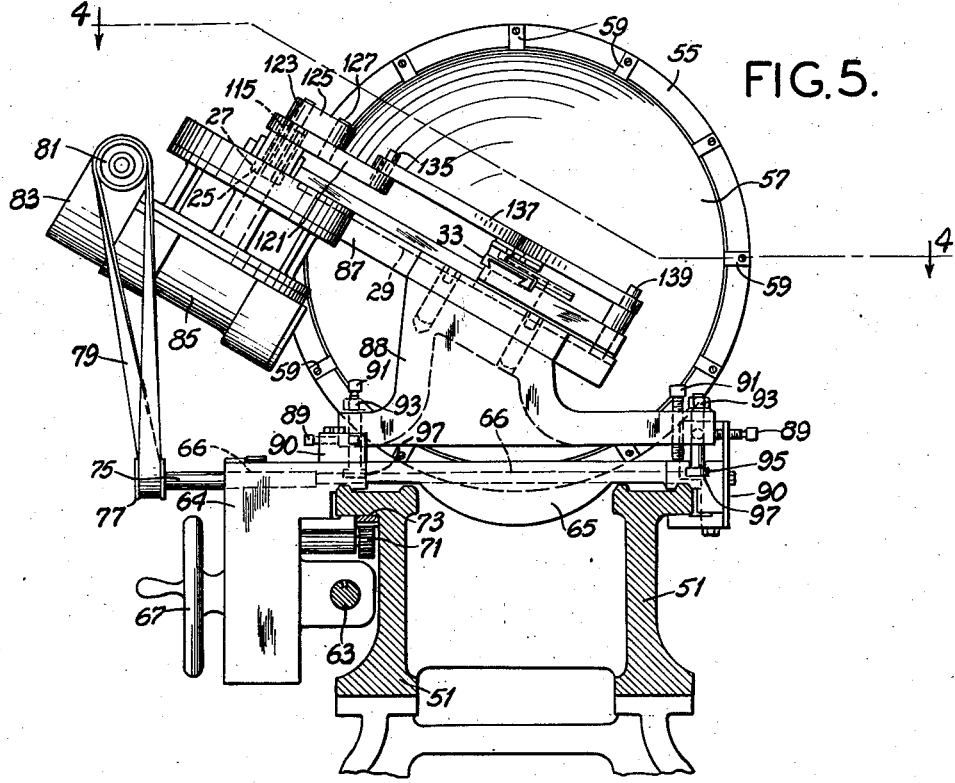
Fig. 5 is a vertical section taken on line 5—5 of Fig. 4.

One way in which to cut or spin or similarly form a paraboloid or the like is to mount the material from which it is to be made upon a rotary device such as a lathe and then work upon it with suitable tools, using a template as a guide. This procedure is essentially no more accurate than the template. The template in turn depends upon manual operation for its accuracy, and the accuracy of manual operations obviously is not consistent at all times.

Various linkages have been suggested for forming conic surfaces of revolution, such as paraboloids, ellipsoids and hyperboloids, but they are open to a common defect, namely that the cutting or forming tool, as it proceeds through its operations, has a varying angular aspect with respect to the curved longitudinal section desired. This means that, if the cutting edge of the tool is anything except a point, inherent inaccuracies are introduced into the surface. For example, if a point is used at the end of the forming tool, in order to eliminate the undesirable result of a varying aspect of forming the tool, the surface becomes a series of definite spiral or circular grooves, making it difficult thereafter to apply a proper finish to the surface, or at least requiring a costly finishing operation.

In order to provide a smooth "finish," a cutting or forming tool ordinarily must have a convex or curvilinear cutting edge rather than a theoretical point, cutting or forming edge or end. Such an edge or end permits of approaching with one operation more closely to the final finish desired without any, or at least only an easy, finishing operation.

The present invention not only provides an improved linkage for moving a cutting or forming tool generally, but includes a mechanism for maintaining the tool at the proper aspect angle with respect to the surface to be worked, so that the desired edge may be employed for smooth finish.

In order that the invention may be better understood, some theoretical aspects of the outlining of parabolas in a plane will first be discussed.

In Fig. 1 is shown a set of rectangular coordinates on X—Y axes. If a width W and a height H be assumed for a desired parabola P, the vertex will be at V, and the parabola may be constructed geometrically by using this vertex V as a pole and employing radial lines R as follows:

The horizontal axis is divided into a predetermined number of equal divisions, for example, eight on each side of the center of the figure, as shown. The vertical or Y axis is divided into an equal number of divisions (of equal or different size) above the X axis. The radial lines R are then drawn from the vertex V to the respective vertical edge divisions 1—8. Where these respective radial lines cross the respective horizontal division lines 1'—8', intercepts K are determined which form the locus of the desired parabola, as shown.

The focus F of this parabola P may be found by known methods, and it is as indicated in the drawings. It is not necessarily on the exact axis, but has been so chosen in the present example.

From the above it will be clear that if a point proceeds along the parabola, and at the same time the drawing plane is rotated, a paraboloid of revolution will theoretically be generated in the space manifold of that plane.

Furthermore, by laying off equal distances D parallel to the Y axis, a second parabola P—2 will be determined, which is the same as P but simply displaced the distance D. The focus F—2 of this parabola P—2 will be displaced from the focus F an equal distance D.

It will also be clear that if a cutting tool such as illustrated at T be moved with its center line C—L parallel to itself, a theoretical cutting point 10 thereon will generate a paraboloid of revolution in a solid if said solid be turned relatively around the Y axis shown. Thus, it will be seen that so long as the cutting point 10 remains theoretically an absolute point, the aspect of the tool T with respect to the parabola P—2 will not affect the theoretical form of the paraboloid.

However, if any attempt be made to employ a linear tool face on said tool, such as for example at N, the face will necessarily intersect the desired curve as shown and generate an improper surface. It will also be seen that the only way in which such an improper aspect of the tool can be avoided is always to maintain the desired face N of the tool tangent to the curve P—2 at point 10. This involves varying the angle of the center line of the tool as it traverses the curve P—2 (see line C'—L').

One of the advantages of this invention consists in causing said tool to angle properly to maintain a constant aspect of the cutting tool face such as N, as indicated for example at N', wherein a constant tangency is always maintained at a center point 10. By this means very fine, broad finishing cuts may be taken, providing mirror-like surfaces of great accuracy without consequential circular or spiral ridges therein, as would occur with a point cutting tool.

In the above method for generating the parabola P—2 (which may be considered as a section of the desired paraboloid of revolution), the motions of the coordinates of the loci K' along the X—Y axis are proportional.

In Fig. 2 is shown the part of the mechanism of the invention which traces by means of a point the geometric construction outline in connection with Fig. 1. In this figure is shown the theoretical parabola P generated by what will hereinafter be referred to as a virtual (not real) generating point 11. This point 11 consists in the center of a pin 13 which is rotary in a tool holder 33 and supports a rotary slider 15. The slider is slidable upon a radius rod 19 pivoted at the vertex V. The rod includes a guide 21 surrounding a pin 23 on a coordinate slider 25. The slider 25 moves parallel to the Y axis in a longitudinal guide 27.

At right angles to the guide 27 is a guide 29 corresponding to the X axis hereinbefore described. In the guide 29 is a slider 31, which slides at right angles to the slider 25.

Various ways may be used for coordinating the desired proportional movements between the sliders 25 and 31. For the purpose of the diagrammatic Fig. 2, I have illustrated these coordinator blocks 25 and 31 as driven by lead screws 35 and 37, geared at 39 in the ratio of 1:2 respectively, so that the screw 37 travels faster but proportionally to the screw 35, thus moving the block 31 throughout its range of movement which in the example chosen is double the range of movement of the block 25.

From the above it will be seen that, if the screw 35 is driven, the screw 37 moving in relation thereto, the pin 23 will assume at successively equal time intervals successive equal intervals on the Y axis. At the same time the block 31 will assume proportional positions at equal intervals on the X axis. Thus, the center line of the tool holder 33 becomes positioned at successive equal intervals along the X axis. The intersection 11 of the center line of the radius rod 19 with the center line of the tool holder 33 fulfills the necessary conditions referred to in connection with Fig. 1.

The above construction solves the problem of providing a mechanism to drive a theoretical point such as 11 along a parabola P. However, since it is impracticable to place a cutting tool at the point 11 which is already occupied by a pin, it is necessary to project the actual cutting tool beyond the point 11 and to generate at point C—P a parallel parabola P—2, the actual focus of which is at F—2. If the tool holder 33 were merely extended to a point C—P, as shown, it would in its various lateral positions assume, with respect to the parabola P—2, various and different angular aspects which have been above designated as undesirable. That is, the problem could not be successfully solved by simply providing a pointed tool on the tool holder 33 extending so that its point is on the parabola P—2, because this would introduce the inability to provide a satisfactory finish.

Therefore, in order to use a round-nosed tool extending to a position in the clear where it can cut the parabola P—2 and remain constantly normal (at fixed aspect) to a tangent on the desired parabola P—2, I provide a swinging tool block 41 (Fig. 3), which, with respect to the tool holder 33, always swings around the cutting point C—P on the parabola P—2. Since the cutting point C—P needs to remain clear for cutting within a bowl-shaped surface, it cannot be used as a point for a pivot pin, and rotation of the block 41 around the center C—P is therefore managed by arranging a circular slide 43 to work in a circular guide 45 in the tool holder 33. The radii of the circular forms for the parts 43 and 45 have centers at C—P.

At the actual focus F—2 of the parabola P—2 is provided a pin 47. This pin is in a guide 49 of a drag link 51. The center line of the link 51 passes through the focus F—2 and point C—P. The link 51 is made rotary about the center C—P by providing it with a circular slide 53 in a circular guide 55 of the tool holder 33.

Connected between the tool holder 33 and the drag link 51 are bisecting links 57 and 59 respectively. The links 57 and 59 are pivoted in common to a pin 61 which works in a slot 63 on the center line of the tool block 41.

From the above it will be clear that, as the tool holder 33 moves (under the influence of the coordinator blocks 25 and 31 and radius rod 19), the center line of the block 41 will always bisect the angle formed by the center lines of the tool holder 33 and the drag link 51. This bisecting center line will always pass through the cutting point C—P, and thus the arcuate face of the tool T always remains with a fixed aspect with respect to the parabola, that is, the tool holder face and the face of the parabola always have coincidental normals G to common tangents H' at C—P, regardless of the position of C—P on the desired parabola.

It will be understood that the geometric and kinematic showings of Figs. 1–3 are diagrammatic and that the various mechanical pairs are illustrated symbolically. In the remaining figures of the case is shown actual apparatus for carrying out the principles described in connection with Figs. 1–3, and so far as possible similar reference characters and description of parts will be used. It should be noted, however, that the lead screw and gear drive for the coordinator blocks 25 and 31 (shown in Figs. 2 and 3) are not used in the remaining figures, a set of ninety-degree, phased slider-crank mechanisms being used for this purpose.

Referring now to Figs. 4–12, there is shown at numeral 51 an ordinary lathe bed on which is a rotary or live spindle 53 carrying a face plate 55 adapted to function as a chuck to support the material 57 (preferably generally cup-shaped) which is to be finished inside to the exact form of a parabola. Holding clamps are shown at 59.

The lathe is driven in the usual way, for example by a belt in connection with the live spindle, and has the usual gear train 61 from the live spindle to a splined lead screw 63, the latter passing through the control apron 64 of the carriage 65. The screw 63, among other things, serves to furnish, through the usual clutch and gear train in the apron 64, a drive for the cross-feed shaft 66 on the carriage 65. Further details of this gear train are believed to be unnecessary because the drive for the present attachment is taken from said cross-feed shaft 66. In the case of the present invention, the lead screw serves to drive the mechanism herein described which is mounted on the carriage.

For manually moving the carriage independently of the lead screw 63 there is provided the usual hand feed wheel 67 functioning through a gear train in the apron 64 to rotate a pinion 71 along a rack 73, the latter being attached rigidly on the lathe bed 51. Thus, the carriage 65 may be manually moved back and forth along the bed by means of the hand wheel 67, and the lead screw 63 furnishes the drive to parts mounted on the carriage. The present apparatus being mounted upon the carriage 65, the drive therefor is picked up at an extension 75 from the cross-feed shaft 66.

The shaft 66 carries a pulley 77 for a quarter-turn belt drive 79 to pulley 81. The pulley 81 drives a double reduction gear 83 in a gear box 85, the latter being attached to a main platen 87. The platen 87 is shown without superimposed parts in Fig. 11. The platen is fastened at 84 to an angle support 88 which in turn is carried upon the carriage 65 and is adjustable in position thereon. The purpose of the angle support is to set the platen 87 into a position which will place the box 85 clear of the lathe bed.

Figures 11, 12:
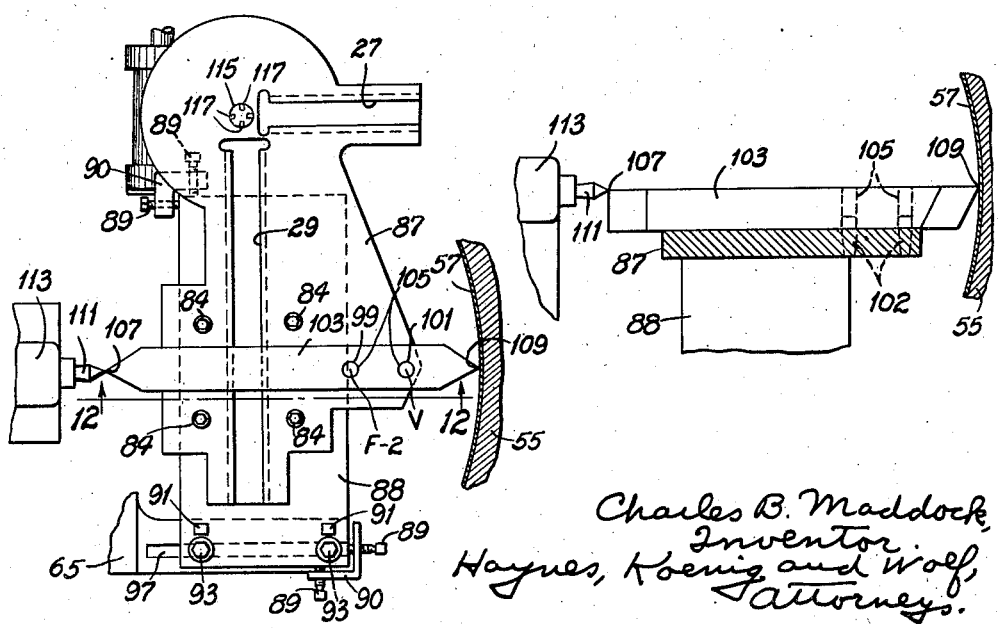
Fig. 11 is a plan view of a carriage with certain operating parts removed and an alignment jig shown in position; and, Fig. 12 is a vertical section taken on line 12—12 of Fig. 11.

Adjustment for the assembly of the unit 87, 88 is obtained by means of the two sets of right-angularly located set screws 89 threaded through L-shaped members 90 at opposite corners of the support 88. The members 90 are attached to the carriage 65. It will be seen that by means of the set screws 89 the support 88 and attached platen 87 may be moved longitudinally, laterally, and angularly. It is held in any given adjusted position by means of locking and elevating studs 91 and 93. The studs 91 work in compression and the studs 93 in tension, having heads 95 loosely located in T-slots 97. The fit between the heads 95 and the T-slots 97 is loose enough to accommodate the angular motion needed for making centering adjustments, as follows:

In order to set the platen 87, two holes 99 and 101 are established thereon for accommodating dowel pins 102 (Figs. 11 and 12). The points 99 and 101 at the start of a cut lie upon the center line of the desired paraboloid. The point 99 is established at what is to become the focus F—2, and the point 101 is established at the vertex V of a parallel paraboloid such as P in Figs. 1 and 2.

A jig 103 having holes 105 is applied to the platen 87 on the pins 102 and establishes linear points 107 and 109 on the same line as points P—2 and V. The platen support 88 and platen 87 are then adjusted as a unit so that the point 109 is at the exact center of the live spindle and is at a point which will become the actual vertex of the actual paraboloid. The point 107 is placed at the point of the center 111 in the tail stock 113. By this means the desired point of real focus F—2 is established on the center line of the lathe. After adjustments for the platen are made, it is tightened down and the jig 103 is removed.

The parts carried upon the platen 87 consist of the driving shaft 115, splined for example at four slots 117, and adapted to be keyed at 116 by means of one of said slots 117 to one of five slots 119 in a bell-crank 121. The choice of four slots 117 in the shaft 115 and five slots 119 in the bell-crank 121 allows for a large number of keyed relative adjustments between the bell-crank 121 and the shaft 115.

At 27 and 29 are shown the right-angular slots in platen 87 for accommodating the coordinator blocks 25 and 31 respectively.

The arms of the bell-crank 121 are phased at ninety degrees as shown. The bell-crank is pivoted at 123 to a connecting rod 125 which in turn is pivoted at 127 to the slider 25 (see also Figs. 7 and 8). Thus, it will be seen that there is substituted for the screw-operation of block 25 the bell-crank 121 with the connecting rod 125.

To obtain a connection between the radius rod 19 and the pin 23 a slot 129 is employed, but it is relied upon for clearance and not for guiding. This is to increase accuracy, there being a shoe 131 formed around the pin 23 which has guide surfaces 133 on the outside of the radius rod 19. Thus, a more accurate bearing is obtained, but the motion is equivalent to that indicated in the kinematic diagram (Fig. 3) at numerals 21, 23.

In order to operate the slide 31, there is provided a second arm on the bell-crank 121 phased at ninety degrees, which is pivoted at 135 to a connecting rod 137 which in turn is pivoted at 139 to the second sliding block 31. The sliding block in Figs. 4 and 6 is of triangular form and has a dove-tailed connection on its bottom with the platen 87 at the guide 29 (see Fig. 9).

Since the pins 135 and 123 of the bell-crank 121 have a crank phase of ninety degrees, and since they work sliders 25 and 31 at a ninety degree angle, the displacements of said sliders are always proportional. Other schemes may be employed for obtaining this proportional movement besides the screw mechanism shown in Fig. 3 and the phased slider-crank mechanism of Fig. 4. The screw mechanism has one advantage however, and that is uniformity of motion as well as proportionality.

The tool support 33 has a dove-tailed slide connection with the slider 31. The relative sliding possible may be seen by comparing Figs. 4 and 6 (see also Fig. 9).

Figure 6:
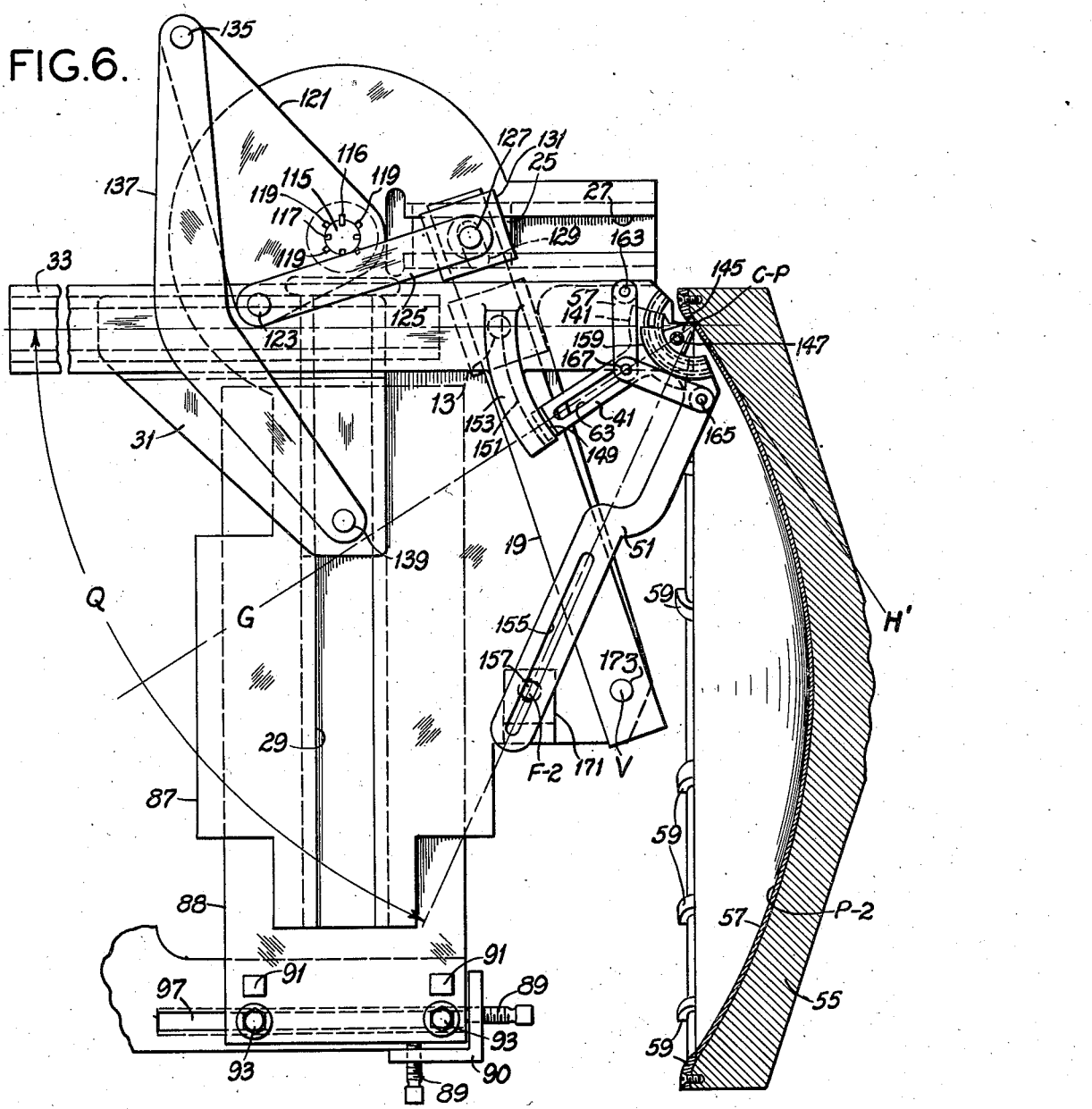
Fig. 6 is a fragmentary enlarged plan view of certain parts of Fig. 4 showing alternate positions of parts.

The practical manner of mounting the swinging tool block 41 is best indicated in Fig. 6 wherein said block will be seen to have an arcuate shaped end bearing portion 141 having a dove-tailed bearing connection 143 with the tool support 33 (see also Fig. 9). The purpose of this is to obtain a rotary connection between the tool block 41 and the tool support 33 which shall have a virtual center at C—P, which is the theoretical point above discussed on the tool. The tool itself consists of a small block of suitably hard cutting material, numbered 145 and held rigidly in position on the tool block 41 by means of a clamp bolt 147. In order to maintain the tool block 41 as rigid as possible in all of its rotary positions, the tail is provided with a tongue 149 which rides in a slot 151 of a guide 153, the latter forming a part of the tool support 33.

The drag link 51 which is shown with an offset (to effect clearances) is slotted as shown at 155 to slide on a pin block 157 at the focus F—2. The center line of the slot 155 passes through the point C—P and focus F—2.

The end of the drag link 51 near the tool 145 is also arcuately dove-tailed with respect to 33, as shown at 159, to effect a rotary relationship between the drag link 51 and the tool support 33. This is done indirectly, without obtaining interference from other parts, by making the slotted connection as shown at 159 with the tool bar 41, which, it is clear, is the equivalent of a direct rotary connection with the tool support 33. The center of curvature of the dove-tailed, slotted connection 159 also is the point C—P on the face of the tool 145.

To maintain the tool 145 normal to the surface being cut, the bisector links 57 and 59 are used, the former being pivoted to the tool support 33 at 163 and the latter to the drag links 51 at 165. The two bisector links 57 and 59 are joined at a pin 167 which rides in a slot 63 of the tool bar 41. The center line of the slot 63 also passes through the point C—P.

Fig. 9 makes clear how the dove-tailed connections 143 and 159 are on opposite sides of the tool bar 41 so as to avoid interference between the two. This figure also clarifies the steadying bearing 151. It also indicates that the pin block 157 at the focus F—2 is supported upon a C-shaped member 171, which in turn is supported on the platen 87. The member 171 has a C-shape in order to clear and accommodate the tool holder 33 in the centered position of the latter (see also Fig. 4).

Figs. 9 and 10 show also how the radius bar 19 is pivoted at the vertex V (of the parallel paraboloid P), a pin 173 being used for the purpose. These figures also show how the slider 15 has a bearing engagement with the radius bar 19 at the top and sides. The pin 13 at the pivot point 11 between the tool holder 33 and the slider 15 is also indicated. When the mechanism moves from the position of Fig. 4 to that shown in Fig. 6, the concentric relationship of Figs. 4, 9 and 10 between pins 13 and 173 disappears.

To operate the device, the jig 103 is first applied to the platen 87, after the parts above described have been removed (Figs. 11 and 12). This is done by applying the holes 105 to the pins 102 at the focal point F—2 and vertex V. The focal point F—2 is that of the actual curve which is cut, and the vertex V is that of the equivalent parallel parabola P. Then adjustments are made so that the platen 87 is moved to bring the jig points 107 and 109 into line respectively with the point of the lathe tail stock center 111 and the center of the live spindle 53. The jig is then removed, and the parts shown in Figs. 4 and 6 are applied.

It will be understood that the angle of the platen 87 may be other than as shown, or the device may even be horizontal, the criterion being simply that the tool works in a plane which includes the longitudinal axis of the desired parabola.

After the parts are mounted and set into the centered position shown in Fig. 4, the entire carriage 65 is manually moved forward by means of wheel 67 until the tool 145 assumes a depth of penetration desired into 57 for the depth of cut to be used. Rotation of the live spindle 53 will then result in causing turning of the material 57 with a drive through the gear 61 to the lead screw 63. The lead screw drives through the gears in the apron 64 to rotate the cross-feed shaft 66 and hence to drive the gear reduction unit 85 through the quarter-turn belt 79. This causes movement of the linkage from the position shown in Fig. 4 to that shown in Fig. 6, the lateral traverse being slow enough to effect a desirable feed.

At numeral 181 is shown an oil sump for containing cutting oil, with a suction pipe 183 leading to a pump 185 driven from a belt drive 187 from the live spindle. A flexible hose 189 leads to a nozzle 191 which is caused to project cutting lubricant upon the tool as it advances. It is clear that the nozzle 191 may be manually controlled to follow the tool, or connected with the tool.

The following will serve to indicate the scope that is intended for claims that follow: A parabola may be thought of as an especial case of an ellipse or a hyperbola. One of the conjugate foci of the parabola is at infinity, the other focus being that at F—2. An ellipse happens to have both conjugate foci finite, as also does the hyperbola. In all three cases of the parabola, ellipse and hyperbola, lines drawn from the foci to any point on the curve will determine an angle Q, the bisector G of which is a normal to the tangent of the curve at that point.

Thus, in Fig. 3, the center line of the tool holder 33 passes through the point C—P and to a focus point at infinity (not shown), and the center line of the drag link 51 passes through the finite locus F—2 and the point C—P. The center line of the tool block 41 is the bisector and is normal to the tangent to the curve at point C—P.

Thus, the center line of the link 51 is parallel to a light ray which would emerge from a point source of light at F—2, and the center line of the tool support 33 is parallel to the emerging direction of said ray from the resulting reflector. The center line of the cutting tool bisects the angle formed between the hypothetical rays in any given plane. It is the constant arrangement of the tool in this manner that accounts for the inherent accuracy of the resulting paraboloid, particularly when applied to making light reflectors.

The amount of advance of the tool along the parabola P—2 per revolution of the work on the live spindle of the lathe is arranged, by means of the gear reduction unit 83, 85 in view of the curvature of the tool face, that only the most inconsequential, if any, ridges are left.

Curve generating systems of the class herein described, involving linkages which inherently produce the desired results, are to be distinguished from non-generating systems in which dependence is placed upon manually made templates.

The bisecting linkage, above described, between the tool support and the drag link to maintain the tool holder at a given aspect with respect to a parabola is only one example of various proportioning means that may be used for maintaining said constant aspect of the tool.

The radius of curvature at the tip of the tool 145 should be less than the minimum radius of curvature of the curve which is being cut.

In view of the above, it will be seen that the several objects of the invention are achieved and other advantageous results attained.

As many changes could be made in the above constructions without departing from the scope of the invention as set forth in the claims, it is intended that all matter contained in the above description or shown in the accompanying drawings shall be interpreted as illustrative and not in a limiting sense. A circle is not considered a conic section in the appended claims.

I claim:

1. A section line generator for conic sections having a plurality of foci comprising a tool having a forming edge which includes a point adapted to traverse the section, said tool having its forming edge lying substantially in the plane of the section, and means for maintaining constant an aspect between said edge and the section line during traverse, such that a line on the tool which is normal to the common tangent between the forming edge and the section line, and which passes through said point, shall always bisect the angle between lines passing from the point to said foci.

2. A section line generator for conic sections having a plurality of foci comprising a cutting tool having a cutting edge of arcuate shape and including a point adapted to traverse the section, said tool having its cutting edge lying substantially in the plane of the section, and a linkage for maintaining constant an aspect between said edge and the section line during traverse, independently of templates or the like, such that a line on the tool which is normal to the common tangent between the forming edge and the section line, and which passes through said point, shall always bisect the angle between lines passing from the point to said foci.

3. A generator for section lines having foci, comprising a tool having a forming edge in which is a point adapted to traverse a line, a support for the tool having a line passing through said point and parallel to the axis of the section line, means for giving the support a longitudinal and a traverse movement with respect to said axis, the tool being rotary with respect to the support about said point on the tool, a link also rotary with respect to said support about said point, a sliding arrangement for said link with respect to the focal point of the section line, and a proportioning linkage between the link and tool holder.

4. A parabolic section line generator comprising a tool having a smooth convex forming edge in which is a point adapted to traverse the section, a support for the tool having movement along a line passing through said point and parallel to the axis of the parabola, means for giving the support a longitudinal and a traverse movement with respect to said axis, the tool being rotary with respect to the support about said point on the tool, a link also rotary with respect to said support about said point, a sliding arrangement for said link with respect to the focal point of the parabolic section, and a bisecting linkage between the link and tool holder to maintain the tool in a predetermined bisecting position between said holder and link.

5. A parabolic section line generator comprising a tool having a forming edge in which is a point adapted to traverse the section, a support for the tool having movement along a line passing through said point and parallel to the axis of the parabola, means for giving the support a longitudinal and a traverse movement with respect to said axis comprising a transversely sliding block slidingly supporting the tool holder for its longitudinal movement, a longitudinally sliding block, a radial arm pivoted at the vertex of a parallel parabola and having a slide connection with the last-named block, and also a connection with the tool holder to control its longitudinal movement.

6. A parabolic section line generator comprising a tool having a smooth convex forming edge in which is a point adapted to traverse the section, a support for the tool having movement along a line passing through said point and parallel to the axis of the parabola, means for giving the support a longitudinal and a traverse movement with respect to said axis comprising a transversely sliding block slidingly supporting the tool holder for its longitudinal movement, a longitudinally sliding block, a radial arm pivoted at the vertex of a parallel parabola and having a slide connection with the last-named block and also a slide connection with the tool holder to control its longitudinal movement, and means for maintaining a predetermined aspect between said convex forming edge and the section line.

7. A parabolic section line generator comprising a tool having a forming edge in which is a point adapted to traverse the section, a support for the tool movable along a line passing through said point and parallel to the axis of the parabola, means for giving the support a longitudinal and a traverse movement with respect to said axis comprising a transversely sliding block slidingly guiding the tool holder for its longitudinal movement, a longitudinal sliding block, a pivoted arm having a slide connection with the last-named block and also a slide connection with the tool holder to control its longitudinal movement, and means for proportionally moving said blocks, the transversely sliding block providing transverse movement of the tool holder.

8. A parabolic section line generator comprising a tool having a forming edge in which is a point adapted to traverse the section, a support for the tool movable along a line passing through said point and parallel to the axis of the parabola, means for giving the support a longitudinal and a traverse movement with respect to said axis comprising a transversely sliding block slidingly guiding the tool holder for its longitudinal movement, a longitudinal sliding block, a pivoted arm having a slide connection with the last-named block and also a slide connection with the tool holder to control its longitudinal movement, and means for proportionally moving said blocks, comprising a double slider-crank mechanism having connections with the sliders which are phased at ninety degrees.

9. A parabolic section line generator comprising a tool having a forming edge in which is a point adapted to traverse the section, a support for the tool having longitudinal movement along a line passing through said point and parallel to the axis of the parabola, means for giving the support a longitudinal and a traverse movement with respect to said axis comprising a transversely sliding block slidingly guiding the tool holder in its longitudinal movement, a longitudinal sliding block, a pivoted radial arm having a slide connection with the last-named block and also a connection with the tool holder to control said longitudinal movement, the tool being rotary with respect to the support about said point on the tool, a link also rotary with respect to said support about said point, a sliding arrangement for said link with respect to the focal point of the parabola, and a bisecting linkage between the link and the tool holder to maintain the tool in a predetermined bisecting position between said holder and link.

10. A parabolic section line generator comprising a tool having a smooth convex forming edge in which is a point adapted to traverse the section, a support for the tool having motion along a line passing through said point and parallel to the axis of the parabola, means for giving the support a longitudinal and a traverse movement with respect to said axis comprising a transversely sliding block slidingly guiding the tool holder in its longitudinal movement, a longitudinal sliding block, a pivoted arm having a slide connection with the last-named block and also a slide connection with the tool holder to control its longitudinal movement, means for proportionally moving said blocks, the tool being rotary with respect to the support about said point on the tool, a link also rotary with respect to said support about said point, a sliding arrangement for said link with respect to the focal point of the parabolic section, and a bisecting linkage between the link and tool holder to maintain the tool in a predetermined bisecting position between said holder and link.

11. A parabolic section line generator comprising a tool having a smooth convex forming edge in which is a point adapted to traverse the section, a support for the tool having movement along a line passing through said point and parallel to the axis of the parabola, means for giving the support a longitudinal and a traverse movement with respect to said axis comprising a transversely sliding block slidingly guiding the tool in its longitudinal movement, a longitudinal sliding block, a radial arm pivoted at the vertex of a parallel parabola and having a slide connection with the last-named block and also a slide connection with the tool holder to control its longitudinal movement, means for proportionally moving said blocks, comprising a double slider-crank mechanism having connections with the sliders phased at ninety degrees, the tool being rotary with respect to the support about said point on the tool, a link also rotary with respect to said support about said point, a sliding arrangement for said link with respect to the focal point of the parabola, and a bisecting linkage between the link and the tool holder to maintain the tool in a predetermined bisecting position between said holder and link.

12. A parabolic section line generator comprising a tool having a forming edge in which is a point adapted to traverse the section, a support for the tool having motion along a line passing through said point and parallel to the axis of the parabola, means for giving the support a longitudinal and a traverse movement with respect to said axis comprising a transversely sliding block slidingly guiding the tool holder in its longitudinal movement, a longitudinal sliding block, a pivoted arm having a slide connection with the last-named block and also a sliding connection with the tool holder to control its longitudinal movement, means for proportionally moving said blocks, comprising a double slider-crank mechanism having connections with the sliders phased at ninety degrees.

13. A parabolic section line generator comprising a tool having a forming edge in which is a point adapted to traverse the section, a support for the tool having motion along a line passing through said point and parallel to the axis of the parabola, means for giving the support a longitudinal and a traverse movement with respect to said axis comprising a transversely sliding block slidingly guiding the tool holder in its longitudinal movement, a longitudinal sliding block, a pivoted arm having a slide connection with the last-named block and also a sliding connection with the tool holder to control its longitudinal movement, means for proportionally moving said blocks, comprising geared screw connections with said blocks.

14. Apparatus for generating conic sections having two foci, comprising a tool support having a line passing through successive points on the section and through one focus, a rotary tool on the support movable about said successive points on the section as centers, a rotary drag link on the support also movable about said points as centers, said drag link having a sliding relationship with respect to means at the other focus, and a bisecting mechanism between the holder and the drag link adapted to maintain the tool at predetermined positions between said lines.

15. Apparatus for generating conic sections having two foci, comprising a tool support having a line passing through successive points on the section and through one focus, a rotary tool on the support movable about the successive points on the section as centers, a rotary drag link on the support also movable about said points as centers, said drag link having a sliding relationship with respect to center means at the other focus, a bisecting mechanism between the holder and the drag link adapted to maintain the tool at a predetermined bisecting position between said lines, said bisecting mechanism comprising a slot associated with the tool, the slot having a center line passing through said point on the section, slide means in said slot, and links of equal lengths pivoted at the same point to said last-named slide means and at their other ends to the tool support and drag link respectively on lines which always cross on said successive points on a section.

16. Means for centering a device of the class described on a lathe bed, comprising an adjustable support on the bed, a jig adapted to be supported upon the support and having two gauging points, said jig being adapted to be placed on the support with said points being located on the same line with a hypothetical focus point and a hypothetical vertex point of a section to be made.

17. Means for centering a device of the class described on a lathe, comprising a support on the bed having rotary, vertical and lateral adjustments, a jig adapted to be supported upon the platen and having two gauging points, said jig being adapted to be placed on the platen with said points being located on the same line with a hypothetical focus point and a hypothetical vertex point of a conic section to be made, said platen being adjustable as to any of said adjustments to bring the gauge points on the jig into alignment with the center line of the jig.

18. In apparatus of the class described, a linkage to be driven, a shaft having a driving connection with said linkage, said driving connection comprising related splined members, one of which has one number of splines and the other another number of splines, and a key effecting a driving connection between less than all of said splines.

19. In apparatus of the class described, a linkage to be driven, a shaft having a driving connection with said linkage, said driving connection comprising related splined members, one of which has an even number of splines and the other an odd number of splines, and a single key effecting a connection between a single pair of said splines.

20. In combination, a driving element provided with slots, a driven element provided with slots having different displacement from the driving element, and a key engaging one slot in the driving element and one slot in the driven element, said key being removable and replaceable in other slots of the driving and driven elements to secure accurately phased, positive, and variable connection between the driving and driven elements.

21. In a kinematic chain for generating a parabola, a base, a straight bar pivoting on a point in said base, means revolving said bar about said point, a slider, and means moving said slider along said bar as said bar revolves so that a predetermined point on said slider traces a parabolic path relative to the base.

22. A conic section line tracer comprising a forming tool having a forming edge including a point adapted to traverse the section, said forming tool having its forming edge lying substantially in the plane of the section, and means for maintaining constant a predetermined aspect between said edge and the section line during traverse.

CHARLES B. MADDOCK.